United States Patent
Oertling

(10) Patent No.: US 9,254,964 B2
(45) Date of Patent: Feb. 9, 2016

(54) TEXTURED-TOP CONVEYOR BELT MODULE

(71) Applicant: Laitram, L.L.C., Harahan, LA (US)

(72) Inventor: Jeremiah E. Oertling, Jefferson, LA (US)

(73) Assignee: Laitram, L.L.C., Harahan, LA (US)

( * ) Notice: Subject to any disclaimer, the term of this patent is extended or adjusted under 35 U.S.C. 154(b) by 14 days.

(21) Appl. No.: 14/254,356

(22) Filed: Apr. 16, 2014

(65) Prior Publication Data

US 2015/0298910 A1 Oct. 22, 2015

(51) Int. Cl.
  *B65G 17/06* (2006.01)
  *B65G 17/40* (2006.01)
  *B65G 17/08* (2006.01)

(52) U.S. Cl.
  CPC .............. *B65G 17/40* (2013.01); *B65G 17/08* (2013.01)

(58) Field of Classification Search
  CPC ................................ B65G 17/40; B65G 17/08
  USPC ........................................ 198/850, 851, 853
  See application file for complete search history.

(56) References Cited

U.S. PATENT DOCUMENTS

| | | | |
|---|---|---|---|
| 5,213,203 A * | 5/1993 | Kinney et al. ................. | 198/850 |
| 5,323,893 A * | 6/1994 | Garbagnati ................. | 198/690.2 |
| 5,497,874 A * | 3/1996 | Layne ........................... | 198/698 |
| 5,613,597 A | 3/1997 | Palmaer et al. | |
| 5,628,393 A * | 5/1997 | Steeber et al. ............. | 198/699.1 |
| 6,467,610 B1 | 10/2002 | MacLachlan | |
| 6,705,460 B2 | 3/2004 | Weiser et al. | |
| 7,111,725 B2 | 9/2006 | Marshall et al. | |
| 7,575,113 B2 | 8/2009 | Sedlacek et al. | |
| 7,802,676 B2 * | 9/2010 | Guldenfels et al. ........... | 198/853 |
| 8,522,961 B2 * | 9/2013 | Marshall et al. ........... | 198/844.1 |
| 8,991,595 B2 * | 3/2015 | Buter .......................... | 198/853 |
| 2003/0196876 A1 | 10/2003 | Weiser et al. | |
| 2014/0318932 A1 * | 10/2014 | van den Berg ......... | B65G 17/08 198/853 |

FOREIGN PATENT DOCUMENTS

| | | |
|---|---|---|
| EP | 1647515 A1 | 4/2006 |
| EP | 2100827 A1 | 9/2009 |
| JP | 63-247208 A | 10/1988 |
| WO | 2010006223 A1 | 1/2010 |

OTHER PUBLICATIONS

International Search Report and Written Opinion of the International Searching Authority, PCT/US2015/025102, mailed Jun. 17, 2015, European Patent Office, Rijswijk, NL.

* cited by examiner

*Primary Examiner* — William R Harp
(74) *Attorney, Agent, or Firm* — Catherine M. Bishop

(57) ABSTRACT

A conveyor belt module has a textured top surface to prevent adhesion of products thereto. The textured top surface is formed by a pattern of humps. The pattern comprises sets of asymmetric and symmetric humps. The symmetric humps are perpendicular to the asymmetric humps. Openings through the module are formed in between the humps.

23 Claims, 4 Drawing Sheets

TEXTURED-TOP CONVEYOR BELT MODULE

BACKGROUND OF THE INVENTION

The invention relates generally to power-driven conveyors and more particularly to modular plastic conveyor belts.

Modular plastic conveyor belts are widely used in various industries to covey products. Modular plastic conveyor belts are generally constructed of a series of rows of side-by-side belt modules. Hinge eyes along opposite ends of each row interleave with hinge eyes of consecutive rows. A hinge rod inserted in the interleaved hinge eyes connects the rows together at hinge joints into an endless conveyor belt loop.

Food products such as fruits and vegetables, especially after having been sliced, have a tendency to adhere to the upper surface of a conveyor belt due to suction between the products and the conveyor belt, the suction usually resulting from the natural juices of the food products, water, or other forms of moisture on the surface of the food products. This adhesion can make it difficult to offload the products from the conveyor belt. It has been found that the provision of small projections on the top surface of a conveyor belt can significantly reduce such adhesion by elevating the products being carried by the conveyor belt above the top surface of the conveyor belt and enabling air to pass beneath the products. This decreases the area of contact between the products and the conveyor belt and thereby reduces the overall adhesive force due to suction.

SUMMARY OF THE INVENTION

A conveyor belt module comprises a main body, hinge elements and a textured top surface to promote release of conveyed product from the module. The textured surface comprises a pattern of humps. A first set of humps comprises a number of parallel asymmetric humps. A second set of humps comprises a series of symmetric humps extending perpendicular to the asymmetric humps. Openings in the module body from the top surface to the bottom surface allow drainage through the module.

According to one aspect, a conveyor belt comprises a textured top surface having a first set of asymmetric humps and a first set of symmetric humps, a bottom surface, a first side edge and a second side edge.

According to another aspect, a conveyor belt comprises a textured top surface having a first set of humps and a second set of humps, a bottom surface, a first side edge and a second side edge. The humps in the first set are spaced laterally apart and extend substantially longitudinally between a first longitudinal location on the top surface and a second longitudinal location on the top surface. The humps in the second set are parallel to and offset laterally and longitudinally from the humps in the first set.

According to another aspect, a conveyor belt module comprises a module body extending longitudinally in the direction of belt travel from a first end to a second end, laterally from a first edge to a second edge and in thickness from a textured top surface to an opposite bottom surface, a first set of hinge elements spaced apart across first gaps along the first end and a second set of hinge elements spaced apart across second gaps along the second end. The textured top surface has a first set of asymmetric humps and a first set of symmetric humps.

According to still another aspect, a conveyor belt module comprises a central spine extending laterally from a first side to a second side, longitudinally from a front end to a rear end and in thickness from a top side to a bottom side, a front beam parallel to the central spine, a rear beam parallel to the central spine, a first set of longitudinal beams extending forward from the central spine and connecting to the front beam, a second set of longitudinal beams extending rearward from the central spine and connecting to the rear beam, a first set of laterally spaced apart hinge elements extending from the front beam, a second set of laterally spaced apart hinge elements extending from the rear beam, a first set of asymmetric humps formed on top of the first set of longitudinal beams and a second set of asymmetric humps formed on top of the second set of longitudinal beams.

BRIEF DESCRIPTION OF THE DRAWINGS

These features and aspects of the invention, as well as its advantages, are better understood by referring to the following description, appended claims, and accompanying drawings, in which:

DETAILED DESCRIPTION OF THE INVENTION

Figure 1:
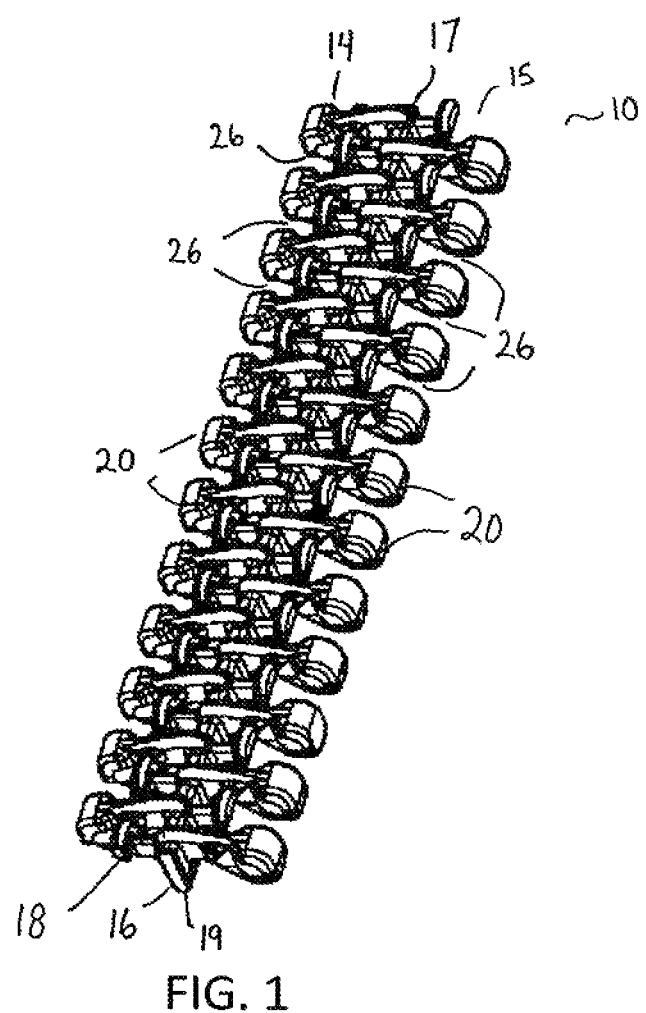
FIG. 1 is an isometric view of a conveyor belt module including a textured top surface according to an illustrative embodiment of the invention.
Figure 2:
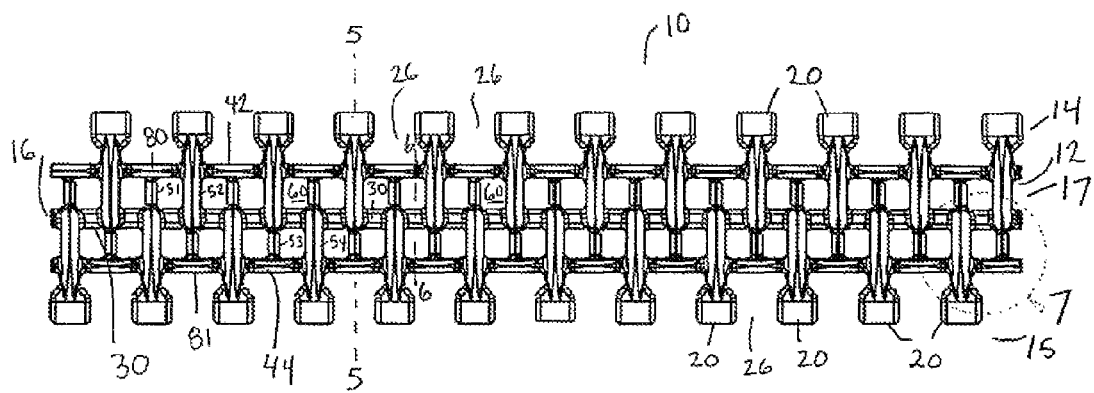
FIG. 2 is a top view of the conveyor belt module of FIG. 1.
Figure 3:
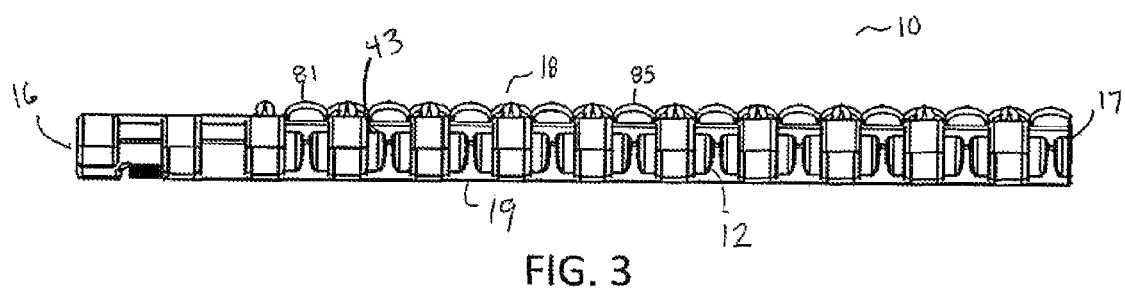
FIG. 3 is a front view of the conveyor belt module of FIG. 1.

A conveyor belt module according to an embodiment of the invention includes a pattern of humps on a top surface to prevent sticking, and openings to allow drainage through the module. The invention will be described below relative to certain illustrative embodiments, though those skilled in the art will recognize that the invention is not limited to the described embodiments.

Referring to FIGS. 1-7, a conveyor belt module 10 for a conveyor belt includes a module body 12 that extends longitudinally from a first end 14 to a second end 15. The longitudinal direction is the direction of belt travel when such a module is built into a modular conveyor belt. The module body extends laterally from a first edge 16 to a second edge 17. In thickness, the module body extends from a top surface 18, which forms the conveying surface on which conveyed articles are carried, to an opposite surface 19. The illustrative top surface 18 is textured to prevent adhesion of product to the module.

Hinge elements, shown as eyes 20, extends longitudinally outward from the first and second ends of the module body. The hinge eyes on one end of the module body are laterally offset from the hinge eyes at the other end, though the invention is not so limited. Gaps 26 between laterally consecutive hinge eyes are sized to receive the hinge eyes of similar modules in an adjacent row of modules in a conveyor belt.

The modules are preferably made of thermoplastic polymers, such as polypropylene, polyethylene, acetal, or composite polymers in an injection-molding process. Plastic conveyor belt modules made in this way are available commercially from Intralox, L.L.C., of Harahan, La., USA.

In another embodiment, the modules are formed of stainless steel or another suitable material.

A number of modules 10 are used to form a conveyor belt. The belt may comprise a series of rows of edge-to-edge belt modules. Modules of different lateral widths may be used to construct the belt in a bricklay pattern. But wide modules extending the entire width of the belt could alternatively be used. The belt may comprise a combination of textured top and non-textured top modules. The rows are interconnected by hinge rods extending laterally through the passageways formed by the aligned openings in the interleaved hinge eyes between adjacent rows. The belt conveys articles atop the conveying surfaces 18 of the modules along an upper carryway portion of the conveyor. The belt is trained around sprockets (or other reversing structure) mounted on each end of the carryway, and returns along a returnway below the carryway.

In the illustrative embodiment, the module body comprises a grid of intersecting beams forming a plurality of openings 60 to allow drainage, though the body may alternatively be solid or have another configuration. The illustrative module body 12 comprises a central spine 30 extending from the first side 16 to the second side 17. The central spine 30 tapers in thickness to a bottom end 32 and may form a drive element for a sprocket. In the illustrative embodiment, the bottom end 32 of the central spine 30 is flat and located slightly below the bottom surface of the hinge elements 20, though the invention is not so limited. The top 34 of the spine 30, which may be rounded, may be coplanar with or offset from the tops 21 of the hinge elements 20.

The module body also includes a front beam 42 and rear beam 44, from which the hinge elements 20 extend. The illustrative front beam 42 and rear beam 44 are parallel to the spine 30 and extend from the first side 16 to the second side 17 of the module body 2. The illustrative front and rear beams 42, 44 are thinner in the longitudinal direction than the spine 30. The illustrative front anal rear beam 42, 44 are shorter in height than the spine, with the bottom 43 of the front and rear beams 42, 44 higher than the bottom of the spine 32. The illustrative bottom 43 of the front and rear beams 42, 44 is sloped. The invention is not limited to the illustrative embodiment of the front beam 42 and rear beam 44.

The module body 12 further includes sets of longitudinal beams extending between and connecting the spine 30 to each front beam 42 and rear beam 44. The illustrative longitudinal beams are perpendicular to the spine 30 and front and rear beams 42, 44, though the invention is not so limited. The longitudinal beams alternate in thickness. As shown, the module body comprises relatively thin front longitudinal beams 51 alternating with relatively thicker front longitudinal beams 52 connecting to the front beam 42. Relatively thin rear longitudinal beams 53 alternate with relatively thicker rear longitudinal beams 54 connecting to the rear beam 44. The thick longitudinal beams 52, 54 extend between the hinge elements 20 and the spine 30, while the relatively thinner longitudinal beams 51, 53 extend between the spine 30 and the spaces 26 between the hinge elements 20.

Openings 60 are formed between the meshed beams 30, 42, 44, 51, 52, 53 and 54. The illustrative openings 60 are substantially rectangular, though the invention is not so limited. The alternating thicknesses of the beams 51, 52, 53, 54 strengthens the hinge elements where required while ensuring an adequate sizing of the openings 60.

The top conveying surface 18 is formed by a pattern of raised projections on the beams. Preferably, the projections have curved tops forming humps to facilitate release of product and prevent sticky products from adhering to the conveying surface. In the illustrative embodiment, the conveying surface comprises a plurality of asymmetric humps extending in the longitudinal direction and a number of symmetric humps extending in the lateral direction. The illustrative embodiment comprises two sets of parallel asymmetric humps and two sets of symmetric humps arranged in series perpendicular to the asymmetric humps, though any suitable pattern for preventing adhesion of product to the top surface may be used.

Figure 4:
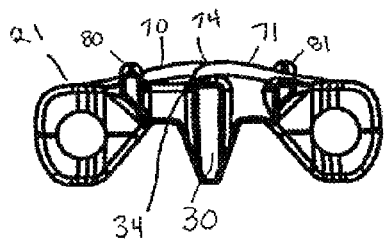
FIG. 4 is a side view of the conveyor belt module of FIG. 1.
Figure 5:
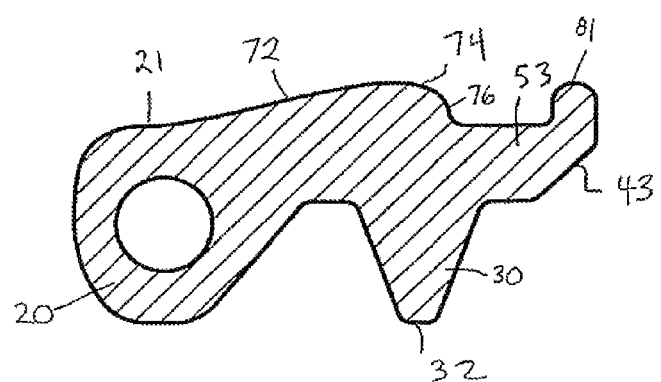
FIG. 5 is a cross-sectional view of the conveyor belt module of FIG. 2 through lines 5-5.
Figure 6:
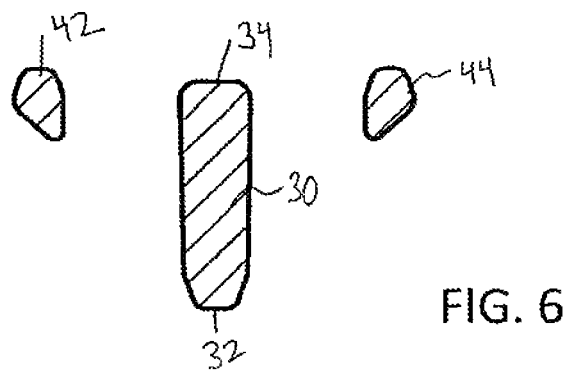
FIG. 6 is a cross-sectional view of the conveyor belt module of FIG. 2 through lines 6-6.
Figure 7:
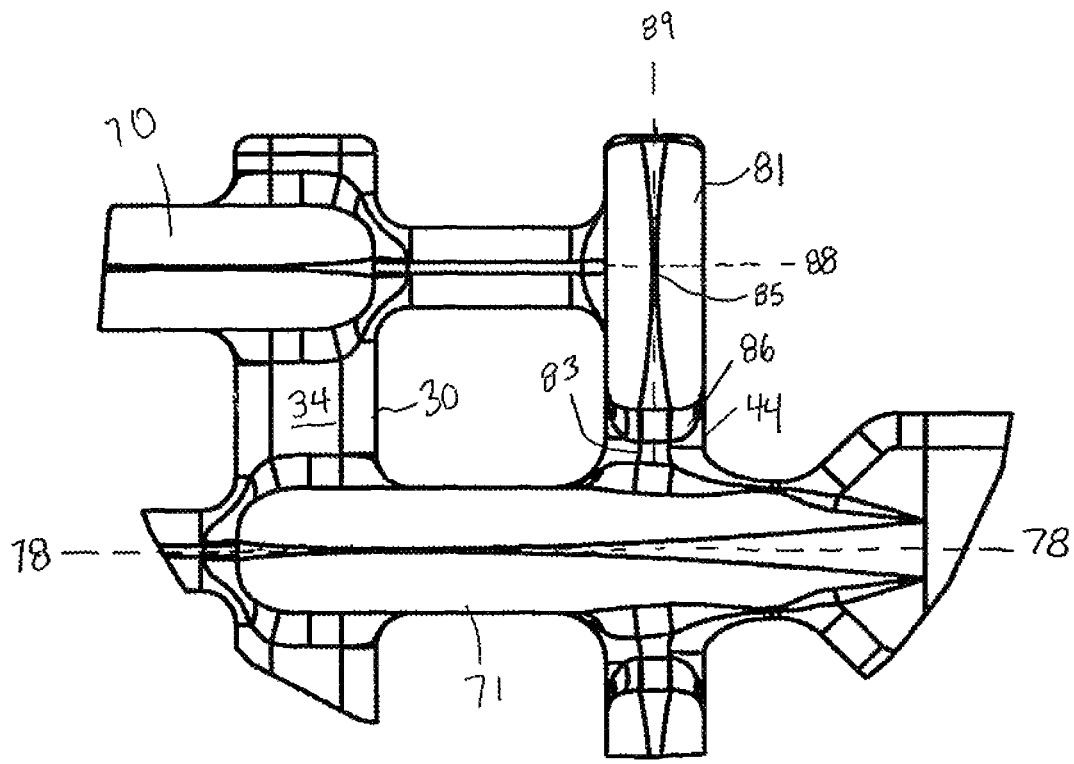
FIG. 7 is a detailed view of section 7 in FIG. 2.

The asymmetric longitudinal humps 70, 71 extend from the top surface 21 of each hinge element 20 to the spine 30, above each relatively thick longitudinal beam 52, 54. The asymmetric longitudinal humps 70, 71 are characterized by a relatively steep inside face 76 and a more gradual outside face 72 characterized by a spline. The outside surface 72 of each asymmetric longitudinal hump extends tangentially from the flat top surface 21 of the hinge 20 forming one side of the spline. The adjacent edge of the hump at crest 74 terminates at 90° relative to the top surface of the beam, such as beam 53 as shown in FIG. 5, forming the opposing edge of the spline. The crest 74 is preferably above the spine 30, and in the illustrative embodiment is located at the longitudinal center of the module body. The inside surface 76 of each asymmetric longitudinal hump 70 terminates at the opposite side of the spine 30, so that the crests 74 of the front asymmetric longitudinal humps 70 overlap the crests of the rear asymmetric longitudinal humps 71 when Viewed from either side 16 or 17 of the module, as shown in FIG. 4. The inside surface 76 of each asymmetric longitudinal hump 70, 71 transitions to the top surface of an opposing thin rib 51 or 53 at a sharper angle than the upper surface 72, creating the asymmetry. The sides of the asymmetric humps 70, 71 may be shaped. The asymmetric humps may be symmetric about a longitudinal plane 78, as shown in FIG. 7. The asymmetric humps 70, 71 may have any suitable height to allow fluid (air and/or water) to flow as product is supported by humps 70, 71, 80, and 81.

The shape of the asymmetric longitudinal humps 70, 71 forces liquid down to the openings 60, and prevents sticking of product on the belt top surface. The openings 60 may have any suitable size and shape, depending at least in part on the size of the conveyed product. The openings are preferably large enough to minimize film formation during dewatering, but small enough to prevent product from being trapped in the openings.

The symmetric humps 80, 81 extend laterally in series between the asymmetric humps 70, 71 across the width of the module along the tops of the front and rear beams 42, 44. In the illustrative embodiments, the textured top surface includes a space 83 between the ends 86 of the symmetric humps 80, 81 and ends of the asymmetric humps 70 or 71, though alternatively, the symmetric humps and asymmetric humps could intersect. The peak 85 of each symmetric hump 80 or 81 aligns with an opposing asymmetric hump 71 or 70. The illustrative symmetric humps 80 and 81, are symmetric about both a lateral plane 89 and a longitudinal plane 88, as shown in FIG. 7.

The symmetric humps 80, 81 have relatively flat front and back faces, but the invention is not so limited.

The symmetric humps 80, 81 and asymmetric humps 70, 71 may have the same heights are different heights.

In an alternate embodiment, the symmetric humps 80, 81 may be omitted or have another configuration.

Figure 8:
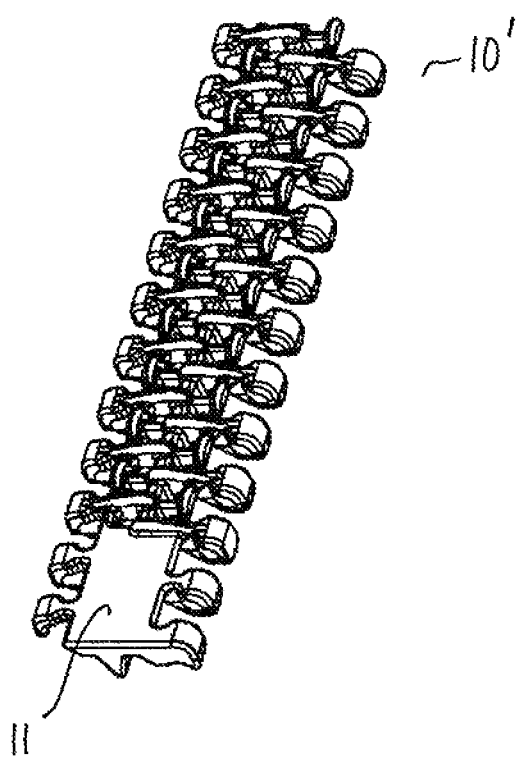
FIG. 8 is an isometric view of a conveyor belt module including a textured top surface according to another embodiment of the invention.

As shown in FIG. 8, at least a portion 11 of module body 10' may be solid. A conveyor belt may comprise a combination of the module bodies 10 and 10'.

The illustrative textured top surface formed by humps is not limited to grid-shaped module body, nor to a conveyor belt formed of modules. For example, a pattern of humps may be formed on a thermoplastic conveyor belt, such as ThermoDrive®, available from Intralox, LLC of Harahan, La.

Although the invention has been described in detail with reference to a few exemplary versions, other versions are possible. The scope of the claims is not meant to be limited to the versions described in detail.

What is claimed is:

1. A conveyor belt, comprising:
   a textured top surface having a first set of asymmetric humps, each asymmetric hump characterized by a relatively steep first face and a more gradual second face opposite the first face, and a first set of symmetric humps, wherein each symmetric hump is symmetric about both a lateral plane and a longitudinal plane;
   a bottom surface;
   a first side edge;
   a second side edge;
   a first end; and
   a second end, the conveyor belt extending longitudinally from the first end to the second end and laterally from the first side edge to the second side edge.

2. The conveyor belt of claim 1, wherein the asymmetric humps in the first set are spaced laterally apart in a substantially parallel manner and each asymmetric hump extends substantially longitudinally between a first longitudinal location on the top surface and a second longitudinal location on the top surface.

3. The conveyor belt of claim 1, wherein the symmetric humps are perpendicular to the asymmetric humps.

4. The conveyor belt of claim 1, further comprising a plurality of openings extending through the conveyor belt from the textured top surface to the bottom surface.

5. The conveyor belt of claim 1, further comprising a second set of asymmetric humps offset laterally from the first set of asymmetric humps, each asymmetric hump of the second set of asymmetric humps extending substantially longitudinally towards the first set of asymmetric humps from a third longitudinal location on the top surface to a fourth longitudinal location on the top surface.

6. The conveyor belt of claim 5, wherein the crests of the first set of asymmetric humps overlap the crests of the second set of asymmetric humps.

7. The conveyor belt of claim 1, wherein at least one symmetric hump extends between ends of two consecutive asymmetric humps.

8. A conveyor belt, comprising:
   a textured top surface having a first set of humps and a second set of humps;
   a bottom surface;
   a first side edge; and
   a second side edge, wherein the conveyor belt extends longitudinally from a first end to a second end and laterally from the first side edge to the second side edge and wherein
   the humps in the first set are spaced laterally apart and each hump in the first set extends substantially longitudinally from a first longitudinal location on the top surface to a crest and from the crest to a second longitudinal location on the top surface the crest being closer to the first longitudinal location than the second longitudinal location, and
   the humps in the second set each extend parallel to and are offset laterally and longitudinally from the humps in the first set.

9. The conveyor belt of claim 8, wherein each hump in the second set extends substantially longitudinally towards the first set of humps from a third longitudinal location on the top surface to a fourth longitudinal location on the top surface.

10. The conveyor belt of claim 8, wherein the humps in the first set are asymmetric, each asymmetric hump characterized by a relatively steep first face and a more gradual second face opposite the first face.

11. The conveyor belt of claim 10, wherein the humps in the second set are asymmetric, each asymmetric hump characterized by a relatively steep first face and a more gradual second face opposite the first face.

12. The conveyor belt of claim 11, wherein the crests of the first and second sets of humps overlap.

13. The conveyor belt of claim 8, further comprising a third set of humps arranged in series and extending substantially perpendicular to the first and second sets of humps.

14. The conveyor belt of claim 13, wherein the humps in the third set are symmetric about both a lateral plane and a longitudinal plane.

15. The conveyor belt of claim 8, further comprising a plurality of openings extending through the conveyor belt from the top surface to the bottom surface.

16. A conveyor belt module, comprising:
   a module body extending longitudinally in the direction of belt travel from a first end to a second end, laterally from a first edge to a second edge and in thickness from a textured top surface to an opposite bottom surface;
   a first set of hinge elements spaced apart across first gaps along the first end; and
   a second set of hinge elements spaced apart across second gaps along the second end;
   wherein the textured top surface has a first set of asymmetric humps, each asymmetric hump characterized by a relatively steep first face and a more gradual second face opposite the first face, and a first set of symmetric humps, wherein each symmetric hump is symmetric about both a lateral plane and a longitudinal plane.

17. The conveyor belt module of claim 16, wherein the asymmetric humps in the first set extend in a longitudinal direction.

18. The conveyor belt module of claim 17, wherein the symmetric humps extend substantially perpendicular to the asymmetric humps.

19. The conveyor belt module of claim 16, further comprising a second set of asymmetric humps parallel to and offset laterally and longitudinally from the first set of asymmetric humps.

20. The conveyor belt module of claim 16, further comprising a plurality of openings extending through the module body from the top surface to the bottom surface.

21. A conveyor belt module, comprising:
   a central spine extending laterally from a first side to a second side, longitudinally from a front end to a rear end and in thickness from a top side to a bottom side;
   a front beam parallel to the central spine;
   a rear beam parallel to the central spine;
   a first set of longitudinal beams extending forward from the central spine and connecting to the front beam;
   a second set of longitudinal beams extending rearward from the central spine and connecting to the rear beam;
   a first set of laterally spaced apart hinge elements extending from the front beam;
   a second set of laterally spaced apart hinge elements extending from the rear beam;
   a first set of asymmetric humps formed on top of the first set of longitudinal beams, each asymmetric hump characterized by a relatively steep first face and a more gradual second face opposite the first face; and a second set of asymmetric humps formed on top of the second set of longitudinal beams, each asymmetric hump characterized by a relatively steep first face and a more gradual second face opposite the first face.

22. The conveyor belt module of claim 21, wherein the hinge elements in the first set of hinge elements align with longitudinal beams in the first set of longitudinal beams.

23. The conveyor belt module of claim 21, further comprising a series of symmetric humps extending on top of the front beam, wherein each symmetric hump is symmetric about both a lateral plane and a longitudinal plane.

\* \* \* \* \*